(12) United States Patent
Fazeli et al.

(10) Patent No.: US 9,856,038 B2
(45) Date of Patent: *Jan. 2, 2018

(54) SERVICING ASSISTING SYSTEM FOR SHOCK STRUTS WITH POSITIVE DEAD VOLUME

(71) Applicant: Goodrich Corporation, Charlotte, NC (US)

(72) Inventors: Amir Fazeli, Ontario (CA); Adnan Cepic, Mississauga (CA)

(73) Assignee: GOODRICH CORPORATION, Charlotte, NC (US)

(*) Notice: Subject to any disclaimer, the term of this patent is extended or adjusted under 35 U.S.C. 154(b) by 175 days.

This patent is subject to a terminal disclaimer.

(21) Appl. No.: 14/969,913

(22) Filed: Dec. 15, 2015

(65) Prior Publication Data

US 2017/0166329 A1    Jun. 15, 2017

(51) Int. Cl.
| | | |
|---|---|---|
| *B64F 5/00* | (2017.01) | |
| *G01M 17/04* | (2006.01) | |
| *B64C 25/60* | (2006.01) | |
| *F16F 9/32* | (2006.01) | |
| *B64F 5/60* | (2017.01) | |
| *B64F 5/40* | (2017.01) | |

(52) U.S. Cl.
CPC ............ *B64F 5/0045* (2013.01); *B64C 25/60* (2013.01); *B64F 5/0081* (2013.01); *B64F 5/40* (2017.01); *B64F 5/60* (2017.01); *F16F 9/3264* (2013.01); *G01M 17/04* (2013.01)

(58) Field of Classification Search
CPC ........ B64F 5/0045; B64F 5/0081; B64F 5/60; B64F 5/40; G01M 5/0045; F16F 9/3264; B64C 25/60
See application file for complete search history.

(56) References Cited

U.S. PATENT DOCUMENTS

| | | | |
|---|---|---|---|
| 8,262,019 B2 | 9/2012 | Schmidt | |
| 8,275,515 B2 | 9/2012 | Wright | |
| 8,565,965 B2 | 10/2013 | Nance | |
| 8,712,634 B2 | 4/2014 | Followell | |
| 9,045,237 B2 | 6/2015 | Nance | |
| 2015/0154819 A1 | 6/2015 | Wilson | |
| 2015/0267769 A1 | 9/2015 | Fazeli | |
| 2017/0166330 A1* | 6/2017 | Fazeli | B64F 5/0081 |

FOREIGN PATENT DOCUMENTS

WO    2014184521    11/2014

* cited by examiner

*Primary Examiner* — Richard Camby
(74) *Attorney, Agent, or Firm* — Snell & Wilmer, L.L.P.

(57) ABSTRACT

System and methods for servicing and monitoring shock struts are provided. A shock strut servicing assistance system may comprise: a controller in electronic communication with a display; and a tangible, non-transitory memory configured to communicate with the controller, the tangible, non-transitory memory having instructions stored thereon that, in response to execution by the controller, cause the controller to perform operations comprising: calculating, by the controller, a dead volume of the shock strut; and determining, by the controller, if a dead volume of the shock strut is negative or not. The operations may further comprise receiving, by the controller, a temperature of a gas and at least one shock strut design parameter, wherein the calculating is performed using the temperature of the gas and the at least one shock strut design parameter.

20 Claims, 10 Drawing Sheets

FIG. 6

SERVICING ASSISTING SYSTEM FOR SHOCK STRUTS WITH POSITIVE DEAD VOLUME

FIELD

The present disclosure relates to landing gear, and more particularly, to systems and methods for increasing the serviceability of shock struts within landing gear.

BACKGROUND

Conventionally, various types of aircraft utilize shock strut assemblies to assist in reducing and managing energy transmitted from landing gear to the structure of an aircraft to which the landing gear is attached. Such shock strut assemblies often feature a piston that compresses a fluid within a sealed chamber. The fluid typically includes a gas segment and a liquid segment. Performance of the shock strut assembly may degrade over time. Such degradation can cause damage to other components of the aircraft, including bearings of the landing gear assembly. With typical single stage shock struts, the aircraft is lifted above the ground so that the shock strut can be in the fully extended position for servicing. Then, the shock strut may be cycled multiple times in attempt to fully remove any trapped gas internal to the shock strut during servicing. This can be time consuming and costly.

SUMMARY

A shock strut servicing assistance system is provided. A shock strut servicing assistance system may comprise: a controller in electronic communication with a display; and a tangible, non-transitory memory configured to communicate with the controller. The tangible, non-transitory memory may have instructions stored thereon that, in response to execution by the controller, cause the controller to perform operations comprising: calculating, by the controller, a dead volume of a shock strut; and determining, by the controller, a first decision, the first decision being a Boolean value based upon whether the dead volume of the shock strut is negative.

In various embodiments, the operations may further comprise displaying, by the controller, a first prompt on the display, wherein the first prompt is displayed in response to the first decision being false. The operations may further comprise activating, by the controller, a first shock strut servicing assistance system in response to the first prompt being false. The operations may further comprise displaying, by the controller, a second prompt on the display, wherein the second prompt is displayed in response to the first prompt being true. The operations may further comprise activating, by the controller, a second shock strut servicing assistance system in response to the second prompt being true. The operations may further comprise activating, by the controller, a third shock strut servicing assistance system in response to the second prompt being false. The second prompt may call for an operator to indicate whether or not a shock strut servicing will be performed under weight-on-wheel conditions. The first prompt may call for an operator to indicate whether or not a ground service equipment (GSE) is available. The operations may further comprise: receiving, by the controller, a temperature of a gas and at least one shock strut design parameter, wherein the calculating is performed using the temperature of the gas and the at least one shock strut design parameter.

A shock strut servicing assistance system may comprise: a controller in electronic communication with a display; and a tangible, non-transitory memory configured to communicate with the controller. The tangible, non-transitory memory may have instructions stored thereon that, in response to execution by the controller, cause the controller to perform operations comprising: sending, by the controller, visible instructions to the display; receiving, by the controller, at least one shock strut parameter, the at least one shock strut parameter including at least one of a pressure of a gas located inside a shock strut, a temperature of the gas located inside the shock strut, or a stroke of the shock strut; calculating, by the controller, a desired number of moles of a gas; calculating, by the controller, a number of moles of the gas added to the shock strut; comparing, by the controller, at least one of the desired number of moles of the gas and the number of moles of the gas added to the shock strut with at least one number of moles threshold value; and sending, by the controller, at least one indicator to the display.

In various embodiments, the indicator may be sent to the display in response to the comparing. The visible instructions may include at least one of: prompting an operator to service the shock strut with oil; and prompting an operator to disconnect an oil charging hose from the shock strut; or prompting an operator to add gas to the shock strut.

A method for servicing a shock strut may comprise: receiving, by a controller, at least one shock strut parameter, the at least one shock strut parameter including at least one of a pressure of a gas located inside a shock strut, a temperature of the gas located inside the shock strut, or a stroke of the shock strut; sending, by the controller, visible instructions to a display; comparing, by the controller, the pressure of the gas located inside the shock strut with at least one gas pressure threshold value; receiving, by the controller, a dead volume of the shock strut; calculating, by the controller, a desired number of moles of the gas; calculating, by the controller, a number of moles of the gas located in the shock strut; and comparing, by the controller, at least one of the desired number of moles of the gas and the number of moles of the gas located in the shock strut with at least one number of moles threshold value.

In various embodiments, the visible instructions may include at least one of: prompting an operator to add oil to the shock strut; prompting the operator to close a second valve and continue adding oil to the shock strut via a first valve until a desired pressure of the oil is achieved; prompting the operator to remove an oil charging hose and connect a gas charging hose to a second valve coupled to the shock strut and to add the gas to the shock strut; prompting an operator to connect a ground service equipment (GSE) to a first valve; prompting an operator to remove the GSE from the first valve; prompting the operator to remove oil from the shock strut in accordance with the dead volume of the shock strut; or prompting the operator to indicate if the oil has been removed from the shock strut. The visible instructions may include at least one of: prompting the operator to compress the shock strut to a fully compressed position via a jack; or prompting the operator to lower the jack to allow the shock strut to extend to a fully extended position. The method for servicing the shock strut may be for servicing a shock strut of an aircraft under a weight-on-wheel condition. The method for servicing the shock strut may be for servicing a shock strut of an aircraft under a weight-off-wheel condition. The method for servicing the shock strut may further comprise sending, by the controller, at least one indicator to the display. The at least one indicator may be sent to the display in response to the comparing. The method for servicing the shock strut may be for servicing a shock strut with a non-negative dead volume The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

Aircraft landing gear systems in accordance with the present disclosure may comprise a shock strut. A shock strut may comprise various fluids such as oil and gas. Performance of the shock strut may be evaluated by monitoring aspects of the shock strut, including gas temperature, gas pressure, oil pressure, and stroke of the shock strut at various points during operation of the aircraft. Stroke may refer to a shock strut piston position. A servicing assistance system may be used in addition to a monitoring system to calculate oil loss and gas loss within a shock strut. Thus, oil and/or gas may be added to the shock strut during a maintenance process where the assisting system indicates to ground crew when the shock strut has been filled with the appropriate volume of oil and/or the gas pressure reaches a desired value. Furthermore, a controller may provide automated assistance during the servicing procedure which may eliminate the need for reference charts to determine the amount of oil or gas of which to add or remove to a shock strut. Hence, independent servicing of oil and gas in a shock strut may be performed and traditional shock strut servicing procedures may be greatly simplified. Generally, during shock strut service, oil is added to a shock strut via a first valve and gas is added to the shock strut via a second valve.

Shock strut servicing systems may be called in response to an aircraft being under a weight-on-wheel condition or a weight-off-wheel condition. An aircraft being under a weight-on-wheel condition may mean that the weight of the aircraft is supported by the wheels of the aircraft. An aircraft being under a weight-off-wheel condition may mean that the weight of the aircraft is not supported by the wheels of the aircraft and consequently is supported by some other means, such as the wings for example.

The following nomenclature corresponds to various equations and parameters described in the present disclosure:
Shock Strut Design Parameters:
A: Piston Area
$P_{gas,nom}$: Desired gas pressure
$\Delta P_{entertainment}$: Over-pressurization needed to compensate for initial gas entrainment
$T_{gas,nom}$: Desired gas temperature
$V_{oil,nom}$: Desired oil volume
$V_{tot-in-air}$: Shock strut internal volume in the fully extended position
$S_{max}$: Shock strut maximum stroke Internal Parameters:

$V_{oil@\hat{T}_{gas}}$: Desired oil volume adjusted at the measured temperature dT: Integration step α: Oil thermal expansion coefficient $n_{gas\text{-}added}$: Number of moles of gas in the shock strut $n_{desired}$: Desired number of moles of gas Z: Compressibility factor R: Ideal gas constant Sensor Measurements:

$\hat{T}_{gas}$: Gas temperature $\hat{P}_{gas}$: Gas pressure

S: Shock strut stroke

Figure 1:
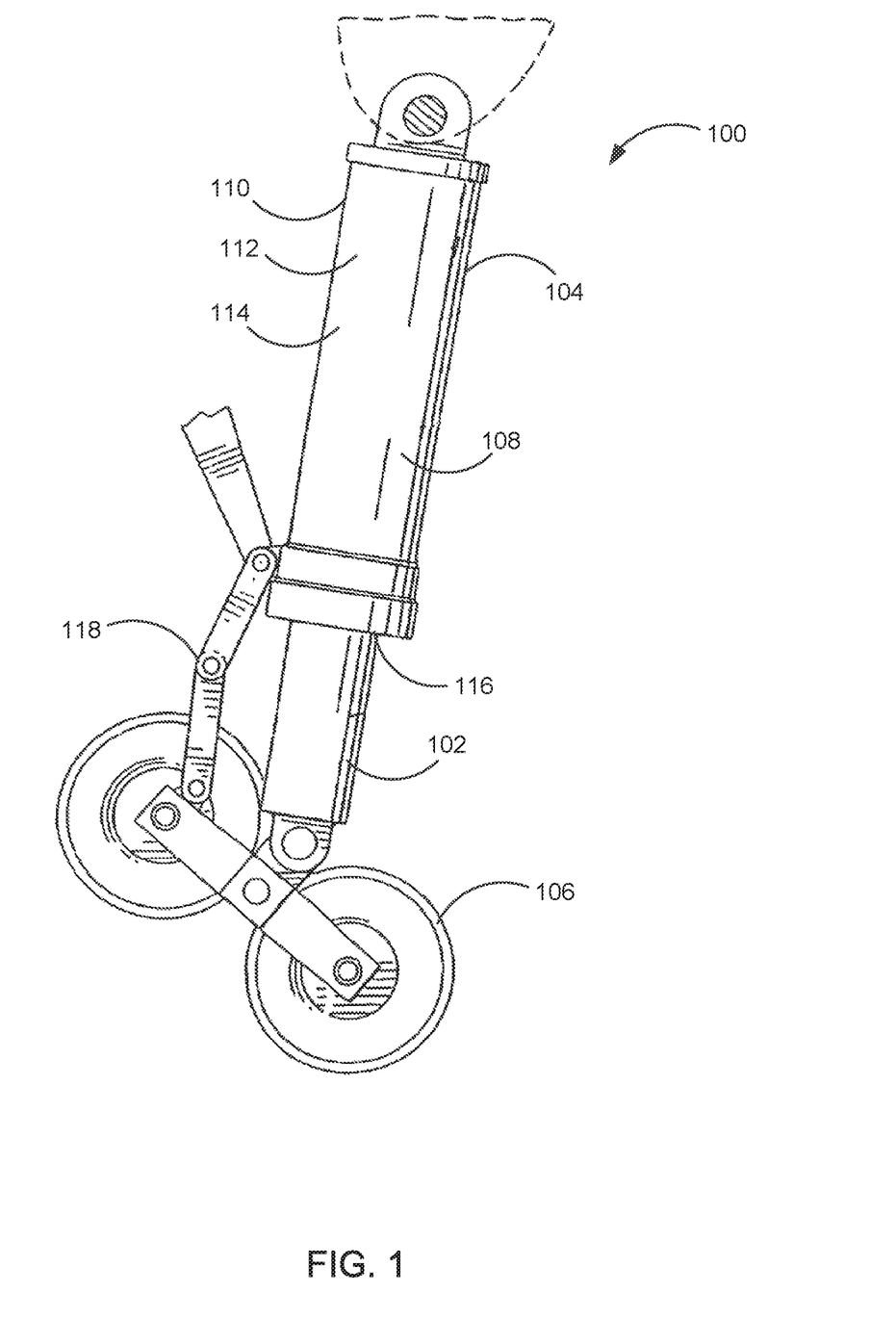
FIG. 1 illustrates a single stage shock strut for use in landing gear of an aircraft, in accordance with various embodiments.

Accordingly, with reference to FIG. 1, a landing gear assembly 100 is illustrated. In various embodiments, landing gear assembly 100 comprises a shock strut 104. Shock strut 104 may be mechanically coupled to a wheel assembly 106. In various embodiments, shock strut 104 may be configured to absorb and dampen forces transmitted by wheel assembly 106 to an aircraft.

Shock strut 104 may comprise, for example, a piston 102 and a cylinder 108. Cylinder 108 may be configured to receive piston 102 in a manner that allows the two components to telescope together and absorb and dampen forces transmitted by wheel assembly 106.

In various embodiments, a liquid, such as a hydraulic fluid or oil, is located within cylinder 108. Cylinder 108 and piston 102 may, for example, be configured to seal such that liquid contained within cylinder 108 is prevented from leaking as piston 102 translates relative to cylinder 108. Further, cylinder 108 may be configured to contain a gas such as nitrogen gas or air. Shock strut 104 may comprise a proximal end and a distal end, wherein the distal end is opposite the proximal end, the distal end being the end of the shock strut closest to a wheel or wheel assembly of a vehicle, such as wheel assembly 106, for example. The air may be positioned above the oil (referred to as an "air-over-oil" arrangement) or vice versa, where the term "above" in this context means in the direction of the proximal end of the shock strut. Similarly, cylinder 108 and piston 102 may be sealed such that gas is prevented from leaking as piston 102 moves relative to cylinder 108. As such, shock strut 104 may comprise a pressurized environment within cylinder 108.

Shock strut 104 may further comprise, for example, a gas pressure sensor 110. In various embodiments, gas pressure sensor 110 may be capable of measuring the pressure of the gas within shock strut 104 at a desired time. For example, gas pressure sensor 110 may measure the gas pressure within shock strut 104 before, during, or after take-off, or at any point during the duty cycle of shock strut 104.

In various embodiments, shock strut 104 may further comprise, for example, a gas temperature sensor 112. Gas temperature sensor 112 may be capable of measuring the temperature of the gas within shock strut 104 at any point during the duty cycle of shock strut 104.

Similarly, shock strut 104 may comprise an oil pressure sensor 114. In various embodiments, oil pressure sensor 114 may be capable of measuring the pressure of the oil within shock strut 104 at a desired time. For example, oil pressure sensor 114 may measure the oil pressure within shock strut 104 at any point during the duty cycle of shock strut 104.

In various embodiments, shock strut 104 may include various other sensors. Shock strut 104 may include an oil temperature sensor. An oil temperature sensor may be used to measure the temperature of oil inside of shock strut 104. An oil temperature sensor may aide in determining the pressure of oil inside of shock strut 104.

Shock strut 104 may also comprise a position sensor 116. In various embodiments, position sensor 116 may be capable of measuring the position of piston 102 relative to cylinder 108, which is conventionally referred to as the stroke of shock strut 104 at a desired time. Position sensor 116 may be configured to measure the position indirectly, for example, by measuring the orientation of one or more shock strut torque links 118 (or other components). For example, position sensor 116 may measure the stroke of shock strut 104 at any point during the duty cycle of shock strut 104.

Figure 2A:
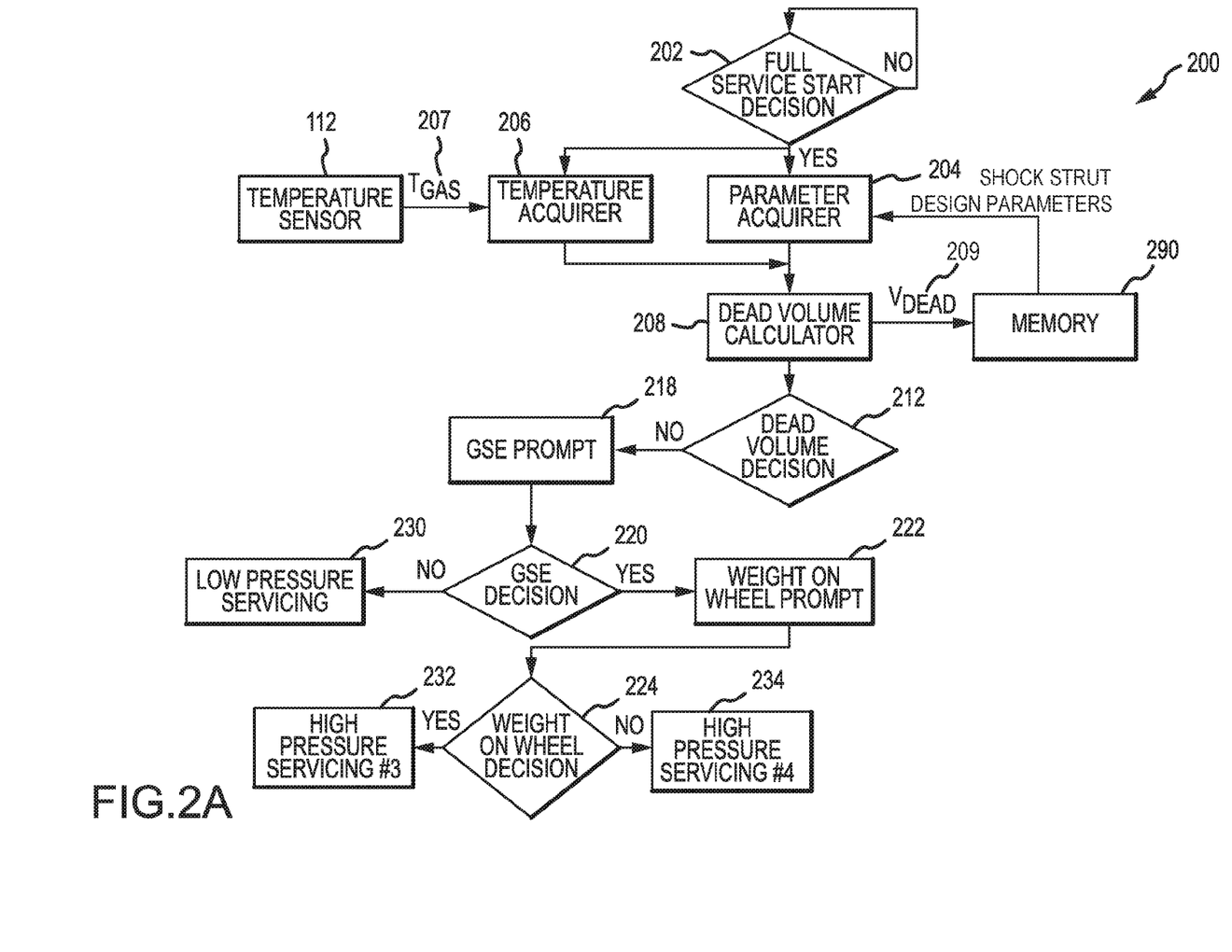
FIG. 2A illustrates a flow chart illustrating a shock strut servicing assistance system, in accordance with various embodiments.

With respect to FIG. 2A, elements with like element numbering, as depicted in FIG. 1, are intended to be the same and will not necessarily be repeated for the sake of clarity.

With reference to FIG. 2A, a flow chart illustrating a shock strut servicing assistance system (SSSAS) 200 is illustrated, in accordance with various embodiments. In various embodiments, SSSAS 200 may comprise system program instructions and/or controller instructions. SSSAS 200 may be located on a handheld device, a tablet device, a smartphone, a computer, or the like. It is contemplated that SSSAS 200 may be located on any controller located on for example, an aircraft or other vehicle.

SSSAS 200 may include a full service start decision 202, parameter acquirer 204, temperature acquirer 206, dead-volume calculator 208, dead-volume decision 212, ground service equipment (GSE) decision 220, and/or weight-on-wheel decision 224. In various embodiments, SSSAS 200 may include memory 290. However, SSSAS 200 may be in electronic communication with memory 290. Memory 290 may be a tangible, non-transitory memory.

In various embodiments, SSSAS 200 may include a shock strut servicing monitoring system (SSSMS). However, in various embodiments, SSSAS 200 and the SSSMS may comprise two separate systems, wherein SSSAS 200 receives various shock strut parameters as one or more inputs.

Figure 2B:
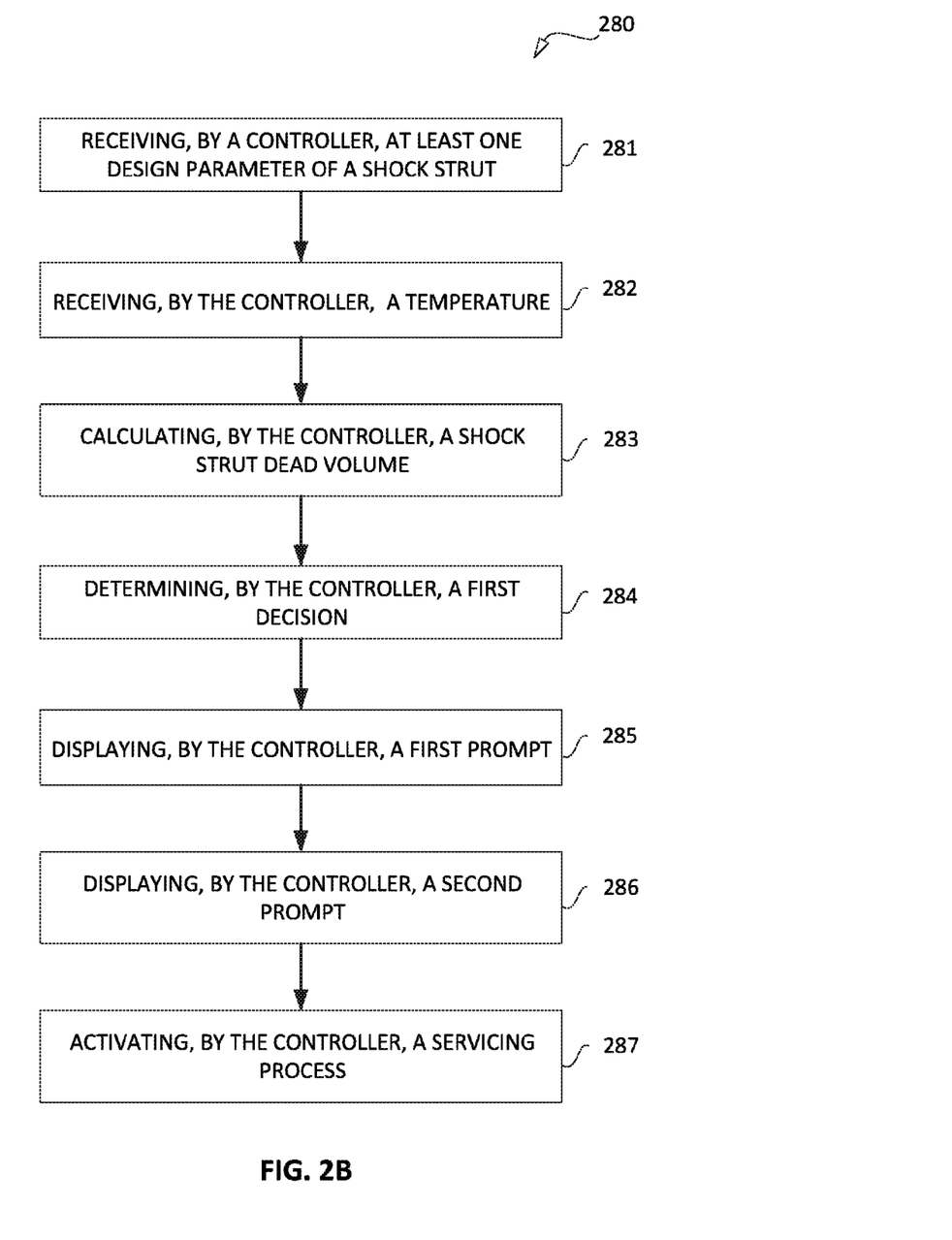
FIG. 2B illustrates the method for assisting shock strut servicing according to FIG. 2A, in accordance with various embodiments.

With further reference to FIG. 2B, full service start decision 202 may determine if an operator or other source has activated SSSAS 200. Full service start decision 202 may be true when SSSAS 200 has been activated, for example, in response to an operator or an automated system activating SSSAS 200. For example, an operator may indicate to a controller that he would like to start SSSAS 200 by clicking on a selectable tab on a display, pushing a start button, or the like. Parameter acquirer 204 may receive shock strut design parameters in response to full service start decision 202 being true (see step 281). Design parameters may be retrieved from memory 290. Design parameters may include design parameters of a shock strut. Design parameters may include desired gas pressure, desired oil volume, shock strut internal volume in the fully extended position, shock strut max stroke, piston area, and/or over-pressurization used to compensate for initial gas entrainment. In various embodiments, temperature acquirer 206 may receive a gas temperature 207 (see step 282). With momentary reference to FIG. 1, the gas temperature 207 may be the temperature of a gas located inside of shock strut 104. Gas temperature 207 may be measured by gas temperature sensor 112.

In various embodiments, dead-volume calculator 208 may calculate the dead volume 209 of a shock strut at the servicing temperature (see step 283), which may be stored into memory 290. Dead volume 209 may be calculated according to equation 1 and equation 2 as given below:

$$V_{oil@\hat{T}_{gas}} = V_{oil,nom}\left(1 + \alpha \times dT \times \text{sign}(\hat{T}_{gas} - T_{nom})\right)^{\frac{|\hat{T}_{gas} - T_{nom}|}{dT}} \quad \text{(EQ. 1)}$$

$$V_{dead} = V_{tot-in-air} - A \times S_{max} - V_{oil@\hat{T}_{gas}} \quad \text{(EQ. 2)}$$

A first decision (also referred to herein as dead-volume decision) 212 may determine if dead volume 209 comprises a negative value (see step 284). For example, dead volume decision 212 may be a Boolean value corresponding to whether dead volume 209 is negative.

In various embodiments, a first prompt (also referred to herein as GSE prompt) 218 may be displayed in response to dead volume 209 comprising a non-negative value (see step 285). Stated another way, GSE prompt 218 may be displayed in response to dead-volume-decision being false. GSE decision 220 may determine if GSE prompt 218 is true. For example, an operator may provide a response to GSE prompt 218 by typing in values from a keyboard, for example. However, GSE prompt 218 may receive an input from other sources such as memory, a controller, or the like. Thus, GSE decision 220 may determine if GSE prompt 218 is true in accordance with a response inputted by an operator or an automated system.

A first shock strut servicing assistance system (also referred to herein as low pressure servicing) 230 may be activated in response to GSE decision 220 being false (see step 287); in other words if a GSE is not available to remove oil from the shock strut at high pressure. Stated another way, low pressure servicing 230 may be activated in response to an operator or other source, such as avionics for example, indicating that a ground service equipment (GSE) is not available to remove oil at high pressure. The activation of low pressure servicing 230 may include displaying instructions on a display indicating that low pressure servicing 230 should be used.

A second prompt (also referred to herein as weight-on-wheel prompt) 222 may be displayed in response to GSE decision 220 being true (see step 286). Stated another way, weight-on-wheel prompt 222 may be displayed in response to dead-volume-decision 212 being false. Weight-on-wheel decision 224 may determine if weight-on-wheel prompt 222 is true. For example, an operator may provide a response to weight-on-wheel prompt 222 by typing in values from a keyboard, for example. Thus, weight-on-wheel decision 224 may determine if weight-on-wheel prompt 222 is true in accordance with the response inputted by an operator or received from another source, for example, via avionics.

A second shock strut servicing assistance system (also referred to herein as high pressure servicing #3) 232 may be activated in response to weight-on-wheel decision 224 being true (see step 287). Stated another way, high pressure servicing #3 232 may be activated in response to an operator or other source, such as avionics for example, indicating that the servicing will be performed weight-on-wheel. The activation of high pressure servicing #3 232 may include displaying instructions on a display indicating that high pressure servicing #3 232 should be used.

A third shock strut servicing assistance system (also referred to herein as high pressure servicing #4) 234 may be activated in response to weight-on-wheel decision 224 being false (see step 287). Stated another way, high pressure servicing #4 234 may be activated in response to an operator or other source, such as avionics for example, indicating that the servicing will not be performed weight-on-wheel or that it will be performed weight-off-wheel. The activation of high pressure servicing #4 234 may include displaying instructions on a display indicating that high pressure servicing #4 234 should be used.

Figure 3A:
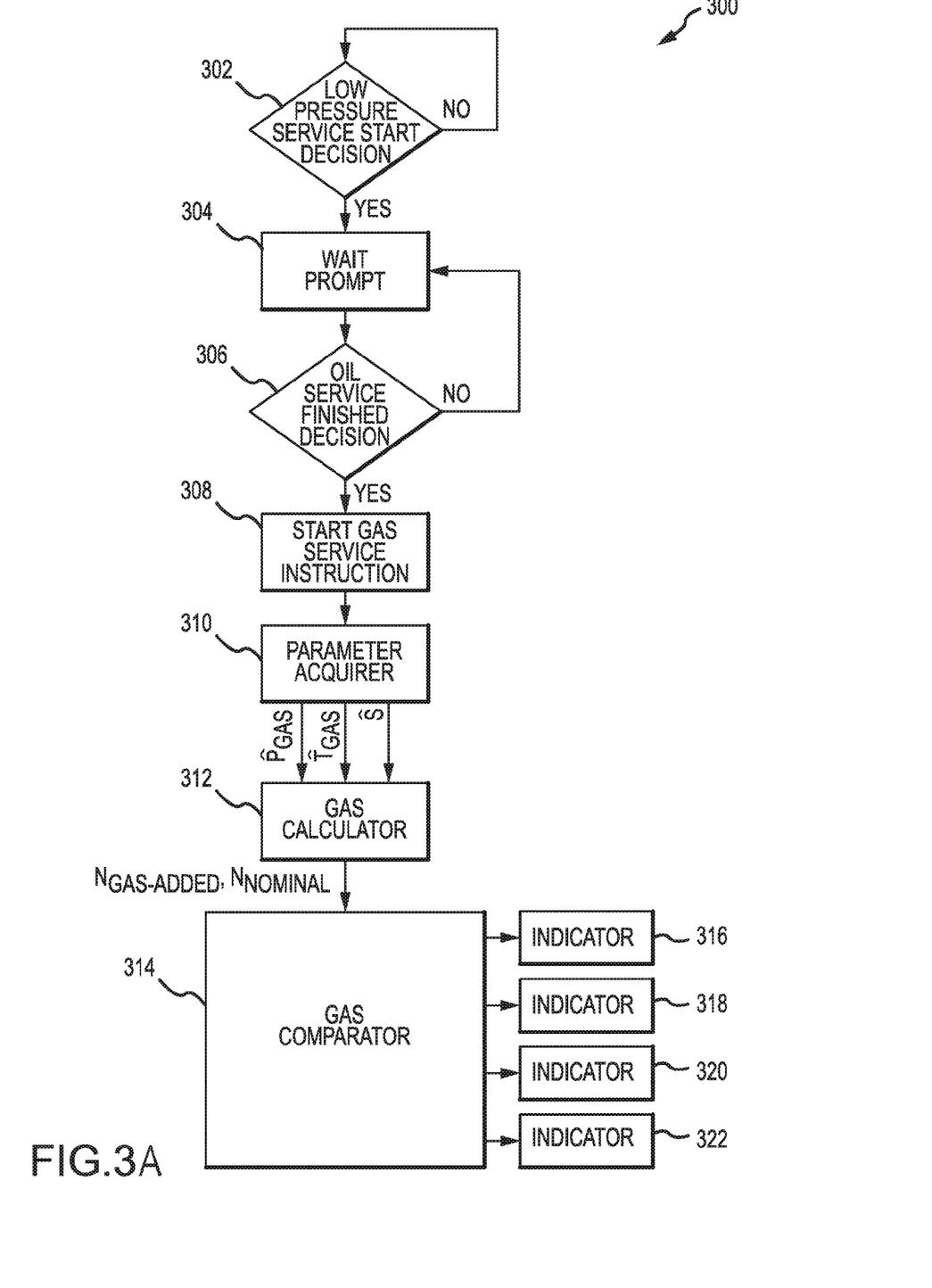
FIG. 3A illustrates a flow chart illustrating a first shock strut servicing assistance system for low pressure servicing, in accordance with various embodiments.
Figure 3B:
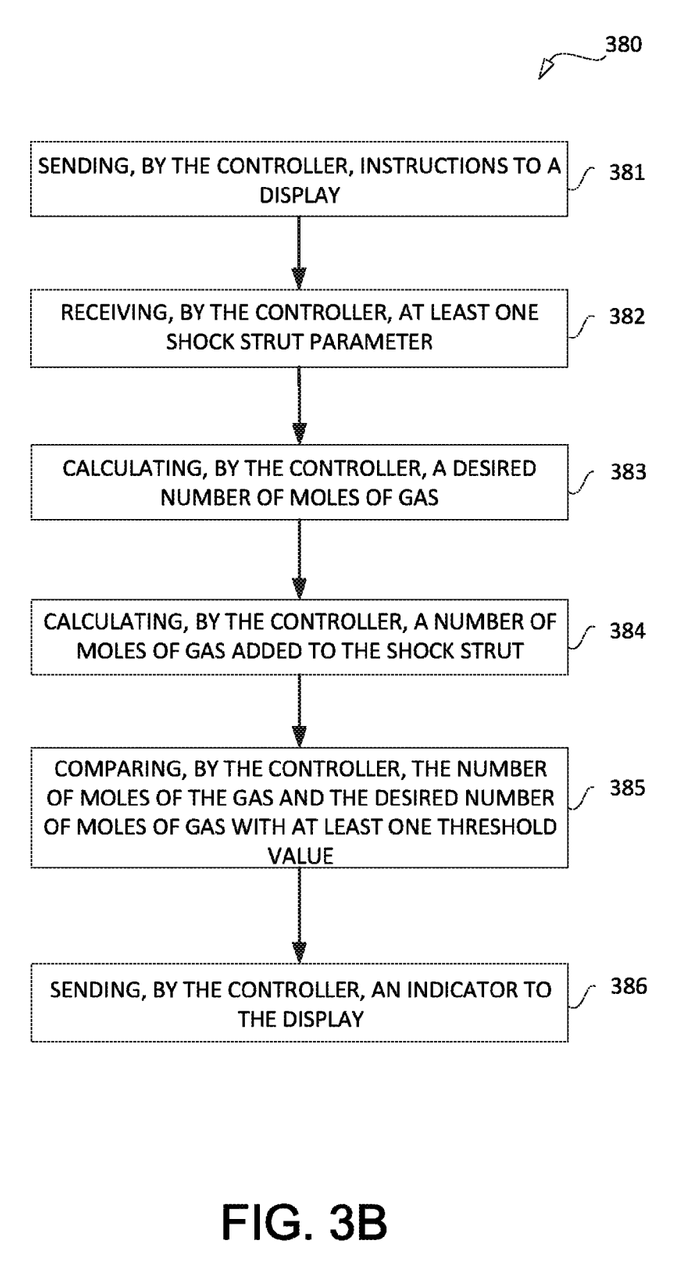
FIG. 3B illustrates the method for assisting shock strut low pressure servicing according to FIG. 3A, in accordance with various embodiments.

With reference to FIG. 3A, a flow chart illustrating low pressure shock strut servicing assistance system (LP-SSSAS) 300 is provided. In various embodiments, LP-SSSAS 300 may comprise system program instructions and/or controller instructions. LP-SSSAS 300 may include low pressure service start decision 302, wait prompt 304, oil service finished decision 306, start gas service instruction 308, parameter acquirer 310, gas calculator 312 and/or gas comparator 314. In various embodiments, low pressure start decision 302 may determine if an operator or other source, such as avionics for example, has activated LP-SSSAS 300. Low pressure start decision 302 may be true when an operator or other source, such as avionics for example, has activated LP-SSSAS 300. For example, an operator may indicate to a controller that he would like to start LP-SSSAS 300 by clicking on a selectable tab on a display, pushing a start button, or the like. With further reference to FIG. 3B, wait prompt 304 may be displayed on a display in response to low pressure start decision 302 being true (see step 381). Wait prompt 304 may indicate to an operator to perform an oil servicing procedure on a shock strut. Oil service finished decision 306 may determine if an operator has indicated that an oil servicing procedure has been performed on a shock strut. For example, an operator may indicate that he has completed an oil servicing procedure by clicking on a selectable tab on a display, pushing a button, or the like.

Start gas service instruction 308 may be displayed on a display in response to oil service decision 306 being true (see step 381). Start gas service instruction 308 may instruct an operator via text, speech, or other visual indicators to disconnect an oil charging hose from a shock strut and start adding gas to the shock strut. Parameter acquirer 310 may receive shock strut parameters (see step 382). Shock strut parameters may include gas pressure, gas temperature, and/or shock strut stroke. Gas calculator 312 may calculate a desired number of moles of gas and the number of moles of gas added to the shock strut during servicing using equations 3 and equations 4, respectively, as given below (see step 383):

$$n_{desired} = \frac{(P_{gas,nom} + \Delta P_{entrainment}) \times (V_{tot-in-air} - V_{oil,nom})}{R \times T_{gas,nom} \times Z(P_{gas,nom}, T_{gas,nom})} \quad \text{(EQ. 3)}$$

$$n_{gas-added} = \frac{\hat{P}_{gas} \times (V_{tot-in-air} - V_{oil,nom} - A \times \hat{S})}{R \times \hat{T}_{gas} \times Z(\hat{P}_{gas}, \hat{T}_{gas})} \quad \text{(EQ. 4)}$$

Gas comparator 314 may receive the desired number of moles of gas and the number of moles of gas added to the shock strut as calculated by gas calculator 312. Gas comparator 314 may compare the difference between these two values, which equals a number of moles of gas loss, with one or more number of moles threshold values (see step 385). For example, the number of moles of gas loss may be equal to the desired number of moles of gas minus the number of moles of gas added. In various embodiments, the number of moles of gas loss may be compared with a first number of moles threshold value, a second number of moles threshold value, and/or a third number of moles threshold value. The second number of moles threshold value may be greater than the first number of moles threshold value. Comparator 314 may comprise one or more if statements.

If the number of moles of gas loss is greater than or equal to the second number of moles threshold value, then indicator (also referred to herein as first indicator) 316 may be displayed (see step 386). First indicator 316 may indicate to an operator to continue adding gas to a shock strut.

If the number of moles of gas loss is greater than or equal to the first number of moles threshold value and less than the second number of moles threshold value, then indicator (also referred to herein as second indicator) 318 may be displayed (see step 386). Second indicator 318 may indicate to an operator to continue adding gas to a shock strut at a slowed rate so as to prevent the operator from over-filling the shock strut with gas.

If the number of moles of gas loss is less than the first number of moles threshold value and greater than or equal to the third number of moles threshold value, for example two percent of the desired number of moles of gas negated, then indicator (also referred to herein as third indicator) 320 may be displayed (see step 386). Third indicator 320 may indicate to an operator to stop adding gas to a shock strut.

If the number of moles of gas loss is less than two percent of the desired number of moles of gas negated, then indicator (also referred to herein as fourth indicator) 322 may be displayed (see step 386). Fourth indicator 322 may indicate to an operator that the shock strut is over serviced with gas and that gas should be released from the shock strut to decrease the pressure of the gas located inside of the shock strut.

Figure 4A:
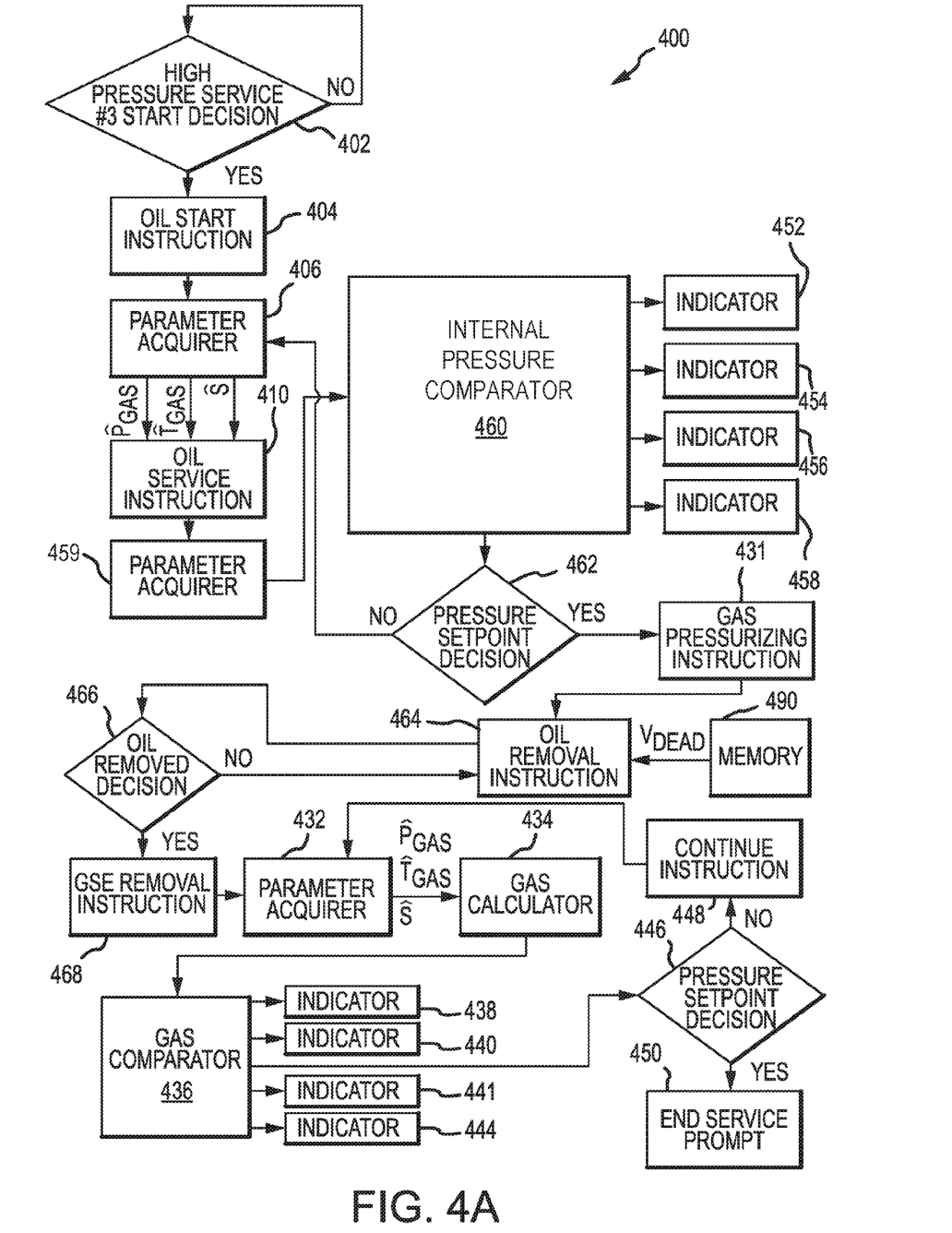
FIG. 4A illustrates a flow chart illustrating a second shock strut servicing assistance system for high pressure servicing, in accordance with various embodiments.
Figure 4B:
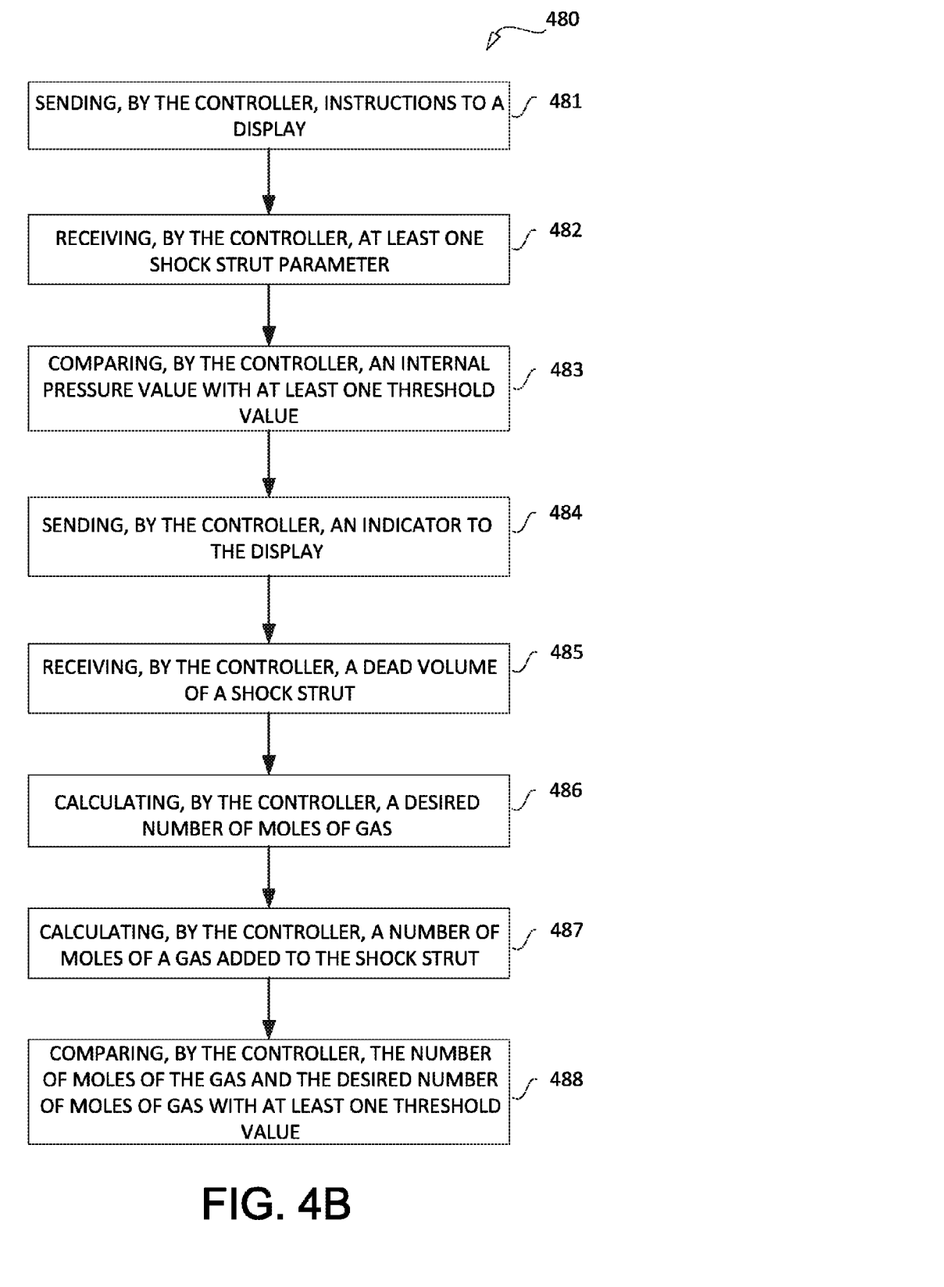
FIG. 4B illustrates the method for assisting shock strut high pressure servicing according to FIG. 4A, in accordance with various embodiments.

With reference to FIG. 4A, a flow chart illustrating a shock strut high pressure servicing assistance system #3 (HP3-SSSAS) 400 is illustrated, in accordance with various embodiments. In various embodiments, HP3-SSSAS 400 may comprise system program instructions and/or controller instructions. HP3-SSSAS 400 may include high pressure service #3 start decision 402, oil start instruction 404, parameter acquirer 406, oil service instruction 410, parameter acquirer 459, gas pressure comparator 460, first pressure setpoint decision 462, gas pressurizing instruction 431, oil removal instruction 464, oil removed decision 466, GSE removal instruction 468, parameter acquirer 432, gas calculator 434, gas comparator 436, second pressure setpoint decision 446 and/or second continue instruction 448. High pressure service #3 start decision 402 may be true in response to an operator or other source, such as avionics for example, activating HP3-SSSAS 400. For example, an operator may indicate to a controller that he would like to start HP3-SSSAS 400 by clicking on a selectable tab on a display, pushing a start button, or the like. With further reference to FIG. 4B, oil start instruction 404 may be displayed on a display in response to high pressure service #3 start decision 402 being true (see step 481). Oil start instruction 404 may display instructions on a display instructing an operator to add oil into a shock strut from a first valve until oil starts to exit the shock strut from a second valve. Oil start instruction 404 may display instructions on a display instructing an operator to close the second valve.

Parameter acquirer 406 may receive shock strut parameters from an SSSMS or from various shock strut sensors (see step 482). Parameter acquirer 406 may receive shock strut parameters including gas pressure, gas temperature, and/or shock strut stroke. Oil service instruction 410 may be displayed on a display and instruct an operator to close a second valve and/or continue adding oil to the shock strut until third indicator 456 is displayed (see step 481).

Parameter acquirer 459 may receive a value indicating the internal pressure of the shock strut from a shock strut sensor or an SSSMS at a pre-determined rate, such as 10 Hz for example (see step 482). Internal pressure comparator 460 may compare this pressure with at least one threshold value (see step 483). Internal pressure comparator 460 may compare the measured pressure with a first pressure threshold value, a second pressure threshold value, and a third pressure threshold value. The first pressure threshold value may comprise a value of 50 psi (344,737.9 Pa), for example. The second pressure threshold value may comprise a value of 100 psi (689,475.7 Pa), for example. The third pressure threshold value may comprise a value of 150 psi (1,034,213.6 Pa), for example. Internal pressure comparator 560 may comprise one or more if statements.

If the internal pressure is less than or equal to the first pressure threshold value, then indicator (also referred to herein as first indicator) 452 may be displayed (see step 484). First indicator 452 may indicate to an operator to continue adding oil to a shock strut.

If the internal pressure is greater than the first pressure threshold value and less than or equal to the second pressure threshold value, then indicator (also referred to herein as second indicator) 454 may be displayed (see step 484). Second indicator 454 may indicate to an operator to continue adding oil to a shock strut at a slow rate.

If the internal pressure is less than the third pressure threshold value and greater than the second pressure threshold value, then indicator (also referred to herein as third indicator) 456 may be displayed (see step 484). Third indicator 456 may indicate to an operator to stop adding oil to a shock strut.

If the internal pressure is greater than the third pressure threshold value, then indicator (also referred to herein as fourth indicator) 458 may be displayed (see step 484). Fourth indicator 458 may indicate to an operator that the shock strut is over serviced with oil and that oil should be slowly released from the shock strut via the second valve.

First pressure setpoint decision 462 may determine if third indicator 456 has been displayed for a pre-determined length of time. Parameter acquirer 459 may continue to acquire shock strut sensor readings in response to first pressure setpoint decision 462 being false.

Gas pressurizing instruction 431 may display instructions on a display instructing an operator to remove an oil charging hose. Gas pressurizing instruction 431 may display instructions on a display instructing an operator to connect a gas charging hose to a second valve. Gas pressurizing instruction 431 may display instructions on a display instructing an operator to pressurize the gas charging hose to a pressure higher than the shock strut internal pressure, for example to 200 psi (1,378,951.5 Pa), and to then slowly open the second valve.

Oil removal instruction 464 may receive a dead volume of a shock strut from memory 490 (see step 485). Oil removal instruction 464 may display instructions on a display instructing an operator to connect a GSE to the first valve and remove a quantity of oil corresponding to the dead volume of the shock strut at the servicing temperature while maintaining an internal pressure inside the shock strut of a pre-determined gauge pressure, such as 200 psi (1378951.5 Pa) for example. For example, if the dead volume is equal to one fluid ounce, then oil removal instruction may instruct an operator to remove one fluid ounce of oil from the shock strut. Oil removal instruction 464 may wait for an input from an operator or other source, such as a controller for example, indicating that the instructed quantity of oil has been removed from the shock strut. Oil removed decision 466 may determine if the user has indicated that the quantity of oil has been removed from the shock strut. GSE removal instruction 468 may display instructions on a display instructing an operator to remove the GSE. GSE removal instruction 468 may display instructions on a display instructing an operator to continue adding gas to the shock strut.

Parameter acquirer 432 may receive shock strut parameters from shock strut sensors or an SSSMS. Parameter acquirer 432 may receive shock strut parameters at a pre-determined rate, such as 10 Hz for example.

Gas calculator 434 may use equation 5, provided below, to calculate a desired number of moles of gas (see step 486). Gas calculator 434 may use equation 6, provided below, to calculate the number of moles of gas added to a shock strut during HP3-SSSAS 400 (see step 487).

$$n_{nominal} = \frac{(P_{gas,nom} + \Delta P_{entrainment}) \times (V_{tot-in-air} - V_{oil,nom})}{R \times T_{gas,nom} \times Z(P_{gas,nom}, T_{gas,nom})} \quad (EQ. 5)$$

$$n_{gas-added} = \frac{\hat{P}_{gas} \times (A \times S_{max} - A \times \hat{S} + V_{dead})}{R \times \hat{T}_{gas} \times Z(\hat{P}_{gas}, \hat{T}_{gas})} \quad (EQ. 6)$$

Gas comparator 436 may be similar to gas comparator 314 (see FIG. 3A) (see step 488). First indicator 438, second indicator 440, third indicator 442, and fourth indicator 444 may be similar to first indicator 316, second indicator 318, third indicator 320, and fourth indicator 322, respectively (see FIG. 3A).

Pressure setpoint decision 446 may determine if third indicator 442 has been displayed for a pre-determined length of time. Second continue instruction 448 may be activated in response to pressure setpoint decision 446 being false. Second continue instruction 448 may instruct parameter acquirer 432 to continue acquiring shock strut parameters. Second continue instruction 448 may display instructions on a display indicating to an operator that further gas adjustment is needed. End service prompt 450 may be displayed on a display in response to pressure setpoint decision 446 being true. End service prompt 450 may indicate that the amount of gas added to the shock strut is acceptable and indicate the end of HP3-SSSAS 400.

Figure 5A:
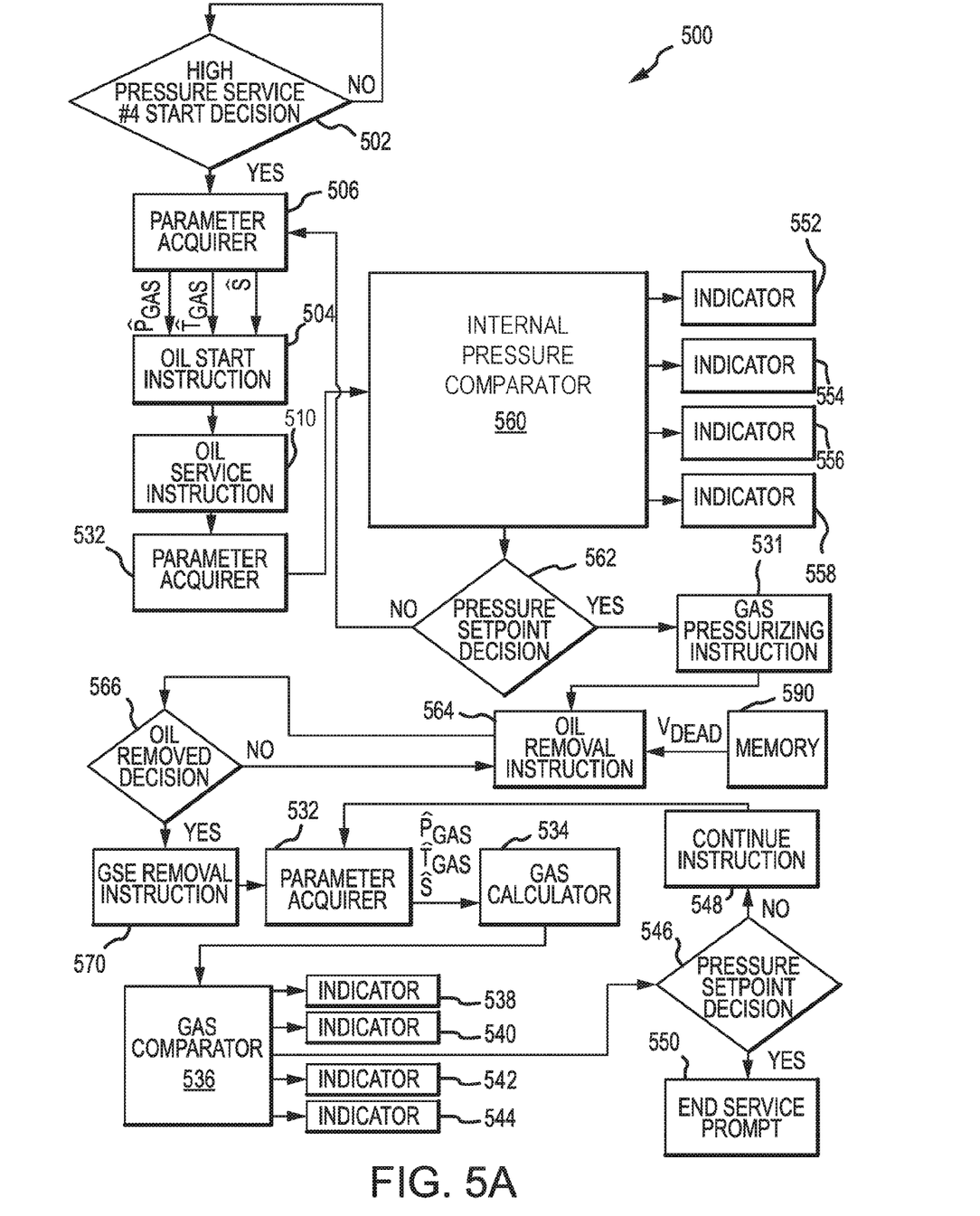
FIG. 5A illustrates a flow chart illustrating a third shock strut servicing assistance system for high pressure servicing, in accordance with various embodiments.
Figure 5B:
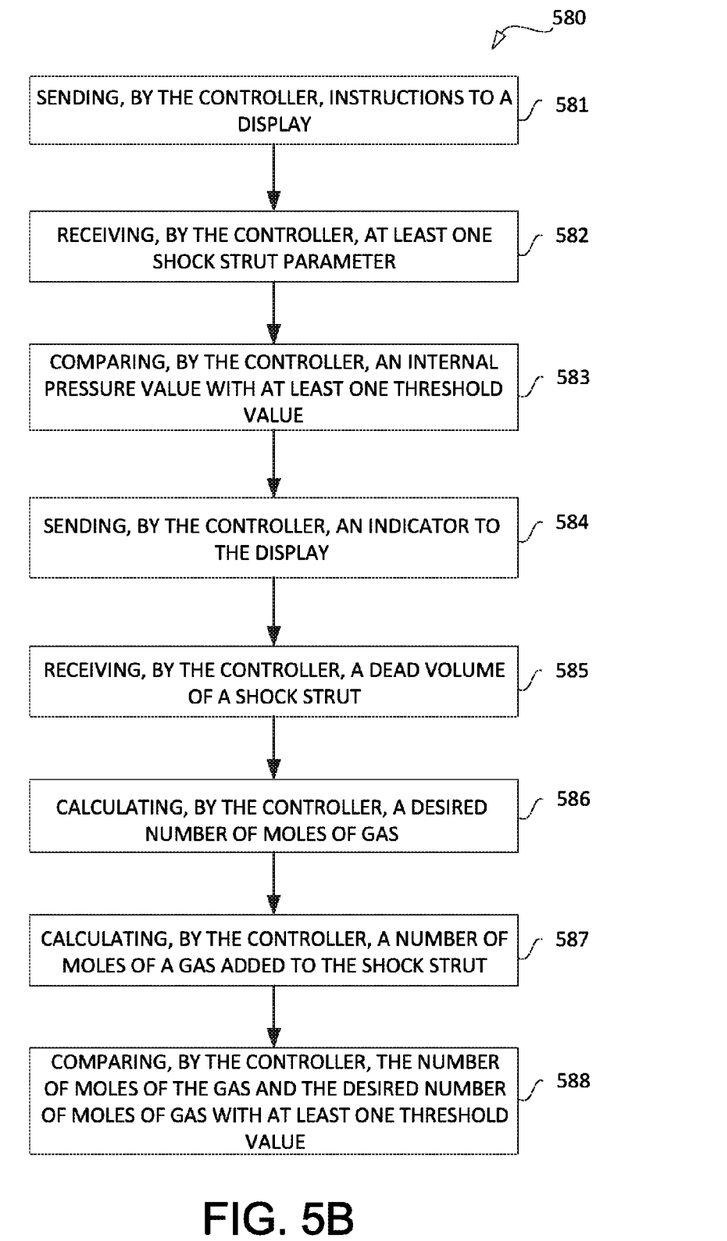
FIG. 5B illustrates the method for assisting shock strut high pressure servicing according to FIG. 5A, in accordance with various embodiments.

With reference to FIG. 5A, a flow chart illustrating a shock strut high pressure servicing assistance system #4 (HP4-SSSAS) 500 is illustrated, in accordance with various embodiments. In various embodiments, HP4-SSSAS 500 may comprise system program instructions and/or controller instructions. HP4-SSSAS 500 may include high pressure service #4 start decision 502, oil start instruction 504, parameter acquirer 506, oil service instruction 510, parameter acquirer 532, internal pressure comparator 560, first pressure setpoint decision 562, gas pressurizing instruction 531, oil removal instruction 564, oil removed decision 566, GSE removal instruction 570, parameter acquirer 532, gas calculator 534, gas comparator 536, second pressure setpoint decision 546 and/or second continue instruction 548. High pressure service #4 start decision 502 may be similar to high pressure service #3 start decision 402 (see FIG. 4A). With further reference to FIG. 5B, oil start instruction 504 may be displayed on a display in response to high pressure service #4 start decision 502 being true (see step 581). Oil start instruction 504 may display instructions on a display instructing an operator to compress a shock strut to the fully compressed position using a landing gear jack. Oil start instruction 504 may display instructions on a display instructing an operator to connect an oil pump to a first valve of a shock strut an start adding oil to the shock strut until oil starts to flow out of the shock strut via a second valve.

Parameter acquirer 506 may receive shock strut parameters from an SSSMS or from various shock strut sensors (see step 582). Parameter acquirer 506 may be similar to parameter acquirer 406 (see FIG. 4A). Oil service instruction 510 may be displayed on a display and instruct an operator to close a second valve and/or continue adding oil to the shock strut until third indicator 556 is displayed (see step 581).

Parameter acquirer 559 may receive a value indicating the internal pressure of a shock strut from a shock strut sensor or an SSSMS at a pre-determined rate, such as 10 Hz, for example (see step 582). Internal pressure comparator 560 may compare this internal pressure with at least one threshold value (see step 583). Internal pressure comparator 560 may be similar to internal pressure comparator 460 (see FIG. 4A).

If the internal pressure is less than or equal to the first pressure threshold value, then indicator (also referred to herein as first indicator) 552 may be displayed (see step 584). First indicator 552 may be similar to first indicator 452 (see FIG. 4A).

If the internal pressure is greater than the first pressure threshold value and less than or equal to the second pressure threshold value, then indicator (also referred to herein as second indicator) 554 may be displayed (see step 584). Second indicator 554 may be similar to second indicator 454 (see FIG. 4A).

If the internal pressure is greater than the second pressure threshold value and less than or equal to the third pressure threshold value, then indicator (also referred to herein as third indicator) 556 may be displayed (see step 584). Third indicator 556 may be similar to third indicator 456 (see FIG. 4A).

If the internal pressure is greater than the third pressure threshold value, then indicator (also referred to herein as fourth indicator) 558 may be displayed (see step 584). Fourth indicator 558 may be similar to fourth indicator 458 (see FIG. 4A).

First pressure setpoint decision 562 may determine if third indicator 556 has been displayed for a pre-determined length of time. Parameter acquirer 506 may continue to acquire internal pressure in response to first pressure setpoint decision 562 being false.

Gas pressurizing instruction 531 may display instructions on a display instructing an operator to remove an oil charging hose. Gas pressurizing instruction 531 may display instructions on a display instructing an operator to connect a gas charging hose to a second valve. Gas pressurizing instruction 531 may display instructions on a display instructing an operator to pressurize the gas charging hose to a pressure higher than shock strut internal pressure, for example 200 psi (1,378,951.5 Pa), and to then slowly open the second valve.

Oil removal instruction 564 may receive a dead volume of a shock strut at servicing temperature from memory 590 (see step 585). Oil removal instruction 564 may display instructions on a display instructing an operator to connect a GSE to the first valve and remove a quantity of oil corresponding to the dead volume of the shock strut while maintaining an internal pressure inside the shock strut of a pre-determined gauge pressure, such as 200 psi (1,378,951.5 Pa) for example. For example, if the dead volume is equal to one fluid ounce, then oil removal instruction may instruct an operator to remove one fluid ounce of oil from the shock strut. Oil removal instruction 564 may wait for an input from an operator indicating that the instructed quantity of oil has been removed from the shock strut. Oil removed decision 566 may determine if the user has indicated that the quantity of oil has been removed from the shock strut. GSE removal instruction 570 may display instructions on a display instructing an operator to remove the GSE. GSE removal instruction 570 may display instructions on a display instructing an operator to lower the landing gear jack until the shock strut piston is in a fully extended position (see step 581).

Parameter acquirer 532 may receive shock strut parameters from shock strut sensors or an SSSMS. Parameter acquirer 532 may be similar to parameter acquirer 432 (see FIG. 4A).

Gas calculator 534 may use equation 5, provided herein to calculate a desired number of moles of gas (see step 586). Gas calculator 534 may use equation 6, provided herein, to calculate the number of moles of gas added to a shock strut during HP4-SSSAS 500 (see step 587).

Gas comparator 536 may be similar to gas comparator 314 (see FIG. 3A) (see step 588). First indicator 538, second indicator 540, third indicator 542, and fourth indicator 544 may be similar to first indicator 316, second indicator 318, third indicator 320, and fourth indicator 322, respectively (see FIG. 3A).

Pressure setpoint decision 546, second continue instruction 548, and end service prompt 550 may be similar to pressure setpoint decision 446, second continue instruction 448, and end service prompt 450 (see FIG. 4A).

Various controller operations are described herein with respect to instructions received by the controller, causing the controller to performing operations in response to instructions inputted by an operator or other source, such as avionics for example. However, it is contemplated that these instructions and/or inputs may be received by other sources such as via avionics, values stored in system memory, shock strut sensors, aircraft systems, or the like.

Various systems are described herein as being configured to be able to send instructions to a display. These instructions may be visible to a person such as an operator performing a shock strut service and thus may be referred to herein as visible instructions.

Figure 6:
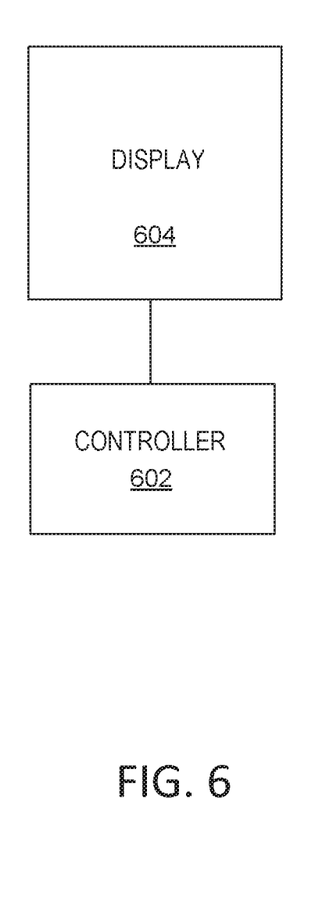
FIG. 6 illustrates a controller in electronic communication with a display, in accordance with various embodiments.

With reference to FIG. 6, a controller 602 is illustrated in electronic communication (e.g., in wired or wirelessly coupled) with a display 604, in accordance with various embodiments. Controller 602 may comprise SSSAS 200 (see FIG. 2A), LP-SSSAS 300 (see FIG. 3A), HP3-SSSAS 400 (see FIG. 4), and/or HP4-SSSAS 500 (see FIG. 5). Controller 602 and/or display 604 may be located on any suitable device such as a desktop computer, a hand-held device, a cellphone, or a controller located onboard an aircraft.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A shock strut servicing assistance system, comprising:
   a controller in electronic communication with a display; and
   a tangible, non-transitory memory configured to communicate with the controller, the tangible, non-transitory memory having instructions stored thereon that, in response to execution by the controller, cause the controller to perform operations comprising:
   calculating, by the controller, a dead volume of a shock strut; and
   determining, by the controller, a first decision, the first decision being a Boolean value based upon whether the dead volume of the shock strut is negative; and
   displaying, by the controller, a first prompt on the display, wherein the first prompt is displayed in response to the first decision being false.

2. The shock strut servicing assistance system of claim 1, wherein the first decision is false in response to the dead volume of the shock strut being positive.

3. The shock strut servicing assistance system of claim 2, wherein the operations further comprise activating, by the controller, a first shock strut servicing assistance system in response to the first prompt being false.

4. The shock strut servicing assistance system of claim 2, wherein the operations further comprise displaying, by the controller, a second prompt on the display, wherein the second prompt is displayed in response to the first prompt being true.

5. The shock strut servicing assistance system of claim 4, wherein the operations further comprise activating, by the controller, a second shock strut servicing assistance system in response to the second prompt being true.

6. The shock strut servicing assistance system of claim 4, wherein the operations further comprise activating, by the controller, a third shock strut servicing assistance system in response to the second prompt being false.

7. The shock strut servicing assistance system of claim 4, wherein the second prompt calls for an operator to indicate whether or not a shock strut servicing will be performed under weight-on-wheel conditions.

8. The shock strut servicing assistance system of claim 2, wherein the first prompt calls for an operator to indicate whether or not a ground service equipment (GSE) is available.

9. The shock strut servicing assistance system of claim 2, wherein the operations further comprise:
receiving, by the controller, a temperature of a gas and at least one shock strut design parameter, wherein the calculating is performed using the temperature of the gas and the at least one shock strut design parameter.

10. A shock strut servicing assistance system, comprising:
a controller in electronic communication with a display; and
a tangible, non-transitory memory configured to communicate with the controller, the tangible, non-transitory memory having instructions stored thereon that, in response to execution by the controller, cause the controller to perform operations comprising:
sending, by the controller, visible instructions to the display;
receiving, by the controller, at least one shock strut parameter, the at least one shock strut parameter including at least one of a pressure of a gas located inside a shock strut, a temperature of the gas located inside the shock strut, or a stroke of the shock strut;
calculating, by the controller, a desired number of moles of a gas;
calculating, by the controller, a number of moles of the gas added to the shock strut;
comparing, by the controller, at least one of the desired number of moles of the gas and the number of moles of the gas added to the shock strut with at least one number of moles threshold value; and
sending, by the controller, at least one indicator to the display.

11. The shock strut servicing assistance system of claim 10, wherein the indicator is sent to the display in response to the comparing.

12. The shock strut servicing assistance system of claim 10, wherein the visible instructions include at least one of:
prompting an operator to service the shock strut with oil;
prompting the operator to disconnect an oil charging hose from the shock strut; or
prompting the operator to add gas to the shock strut.

13. A method for servicing a shock strut, comprising:
receiving, by a controller, at least one shock strut parameter, the at least one shock strut parameter including at least one of a pressure of a gas located inside a shock strut, a temperature of the gas located inside the shock strut, or a stroke of the shock strut;
sending, by the controller, visible instructions to a display;
comparing, by the controller, the pressure of the gas located inside the shock strut with at least one gas pressure threshold value;
receiving, by the controller, a dead volume of the shock strut;
calculating, by the controller, a desired number of moles of the gas;
calculating, by the controller, a number of moles of the gas located in the shock strut; and
comparing, by the controller, at least one of the desired number of moles of the gas and the number of moles of the gas located in the shock strut with at least one number of moles threshold value.

14. The method of claim 13, wherein the visible instructions include at least one of:
prompting an operator to add oil to the shock strut;
prompting the operator to close a second valve and continue adding oil to the shock strut via a first valve until a desired pressure of the oil is achieved;
prompting the operator to remove an oil charging hose and connect a gas charging hose to a second valve coupled to the shock strut and to add the gas to the shock strut;
prompting the operator to connect a ground service equipment (GSE) to a first valve;
prompting the operator to remove the GSE from the first valve;
prompting the operator to remove oil from the shock strut in accordance with the dead volume of the shock strut; or
prompting the operator to indicate if the oil has been removed from the shock strut.

15. The method of claim 14, wherein the visible instructions include at least one of:
prompting the operator to compress the shock strut to a fully compressed position via a jack; or
prompting the operator to lower the jack to allow the shock strut to extend to a fully extended position.

16. The method of claim 14, wherein the method for servicing the shock strut is for servicing a shock strut of an aircraft under a weight-on-wheel condition.

17. The method of claim 15, wherein the method for servicing the shock strut is for servicing a shock strut of an aircraft under a weight-off-wheel condition.

18. The method of claim 13, further comprising:
sending, by the controller, at least one indicator to the display.

19. The method of claim 18, wherein the at least one indicator is sent to the display in response to the comparing.

20. The method of claim 13, wherein the method for servicing the shock strut is for servicing a shock strut with a non-negative dead volume.

* * * * *